United States Patent [19]

Janssen

[11] 4,413,108

[45] Nov. 1, 1983

[54] ANAEROBICALLY-CURING COMPOSITIONS

[75] Inventor: Edward W. Janssen, Roseville, Minn.

[73] Assignee: Minnesota Mining & Manufacturing Company, St. Paul, Minn.

[21] Appl. No.: 289,702

[22] Filed: Aug. 3, 1981

Related U.S. Application Data

[63] Continuation-in-part of Ser. No. 203,683, Nov. 3, 1980, abandoned.

[51] Int. Cl.³ .............................................. C08F 20/20
[52] U.S. Cl. ..................................... 526/301; 526/89; 526/204; 526/205; 526/206; 526/214; 526/210; 526/212; 526/309; 526/313; 526/317; 526/320; 526/323.1; 526/323.2
[58] Field of Search ................. 526/323.1, 323.2, 313, 526/309, 320, 317, 301, 89, 204, 205, 206, 214, 210, 212

[56] References Cited

U.S. PATENT DOCUMENTS

| | | | |
|---|---|---|---|
| 2,895,950 | 7/1959 | Krieble | 260/89.5 |
| 3,203,941 | 8/1965 | Krieble | 260/89.5 |
| 3,658,624 | 4/1972 | Lees | 156/332 |
| 3,672,942 | 6/1972 | Newmann | 117/62.2 |
| 3,775,385 | 11/1973 | Oxono et al. | 260/79 |
| 3,957,561 | 5/1976 | Skoultchi | 156/331 |
| 3,980,627 | 9/1976 | McDowell et al. | 526/328 |
| 3,987,037 | 10/1976 | Bonham et al. | 260/240 D |
| 4,052,244 | 10/1977 | Skoultchi | 156/310 |
| 4,081,308 | 3/1978 | Skoultchi | 156/310 |

OTHER PUBLICATIONS

"Vinyl Polymerization by Metal Complexes", *Chemical Abstracts*, vol. 84, 84: 17864s (1976).

*Primary Examiner*—Harry Wong, Jr.
*Attorney, Agent, or Firm*—Donald M. Sell; James A. Smith; Robert W. Sprague

[57] ABSTRACT

Anaerobically-curing compositions are described comprising (A) a polymerizable monomer; (B) a halogen-containing compound as a first initiator component; (C) an organic thiol as a second initiator component; and (D) an inhibitor of free-radical polymerization. These compositions are particularly suitable as adhesives and may be formulated as thread-locking adhesives, or may be modified by the addition of various modifying polymers to obtain desired properties such as increased viscosities or pressure-sensitive properties.

16 Claims, No Drawings

ANAEROBICALLY-CURING COMPOSITIONS

CROSS-REFERENCE TO RELATED APPLICATIONS

This application is a continuation-in-part of copending U.S. application Ser. No. 203,683 now abandoned which was filed on Nov. 3, 1980.

BACKGROUND OF THE INVENTION

This invention relates to anaerobically-curing compositions.

Anaerobically-curing compositions generally comprise polymerizable acrylate monomers and free-radical initiators. When maintained in an oxygen-containing environment, such compositions remain uncured (i.e., unpolymerized). However, in the absence of oxygen, such as when an anaerobically-curing composition is placed between surfaces which are in close engagement with one another (e.g. a nut and bolt), cure will ensue.

Anaerobically-curing compositions containing peroxide or hydroperoxide initiators are well-known in the art, having been described in U.S. Pat. No. 2,895,950 (Krieble). Commonly such compositions contain quinone-type compounds which act as polymerization inhibitors, thereby maintaining the compositions in an uncured state when stored in the presence of oxygen.

Unfortunately, anaerobically-curing compositions which contain peroxide or hydroperoxide initiators may possess certain disadvantages. For example, there is often the possibility of explosion whenever large amounts of peroxy compounds are handled such as during manufacture of these compositions. Furthermore, unfortunately peroxy compounds typically decompose with time, thus resulting in a steadily decreasing ability of such compounds to initiate the polymerization of compositions containing them.

While one-part, anaerobically-curing compositions containing polymerization initiators other than peroxy compounds are known in the art, such compositions often fail to exhibit a suitable balance of shelf-life stability versus cure-rate. In particular, while such compositions may exhibit suitable shelf-like stability in the presence of oxygen, they may cure at unsatisfactory rates when oxygen is excluded. Alternatively, such compositions may often cure rapidly in the absence of oxygen, but may exhibit unsatisfactory shelf-lives.

BRIEF SUMMARY OF THE PRESENT INVENTION

The present invention provides novel anaerobically-curing compositions comprising (A) a polymerizable monomer having at least one $\alpha,\beta$-unsaturated carboxyl functionality per molecule of monomer; (B) a halogen-containing compound as a first initiator component; (C) an organic thiol as a second initiator component; and (D) an inhibitor of free-radical polymerization.

The compositions of the present invention exhibit suitable shelf-life (e.g., at least about 4 weeks at 120° F.) when stored in the presence of oxygen and cure rapidly to form strong bonds in the absence of oxygen. Furthermore, the compositions of the present invention, since they do not contain peroxides or hydroperoxides, may be stored for extended periods of time without fear of initiator decomposition. Also, since the compositions of the present invention do not contain peroxides or hydroperoxides, there is no possibility of explosion during manufacture of these compositions.

The compositions of the present invention are particularly suitable for bonding operations involving at least one active metal (e.g., copper and cold-rolled steel) and are further suitable for bonding relatively inactive metals (e.g., zinc and cadmium). The compositions are also suitable for bonding nonmetallic substrates (e.g., plastic, glass and wood) provided that appropriate primers are used to accelerate the cure to a useful rate.

The compositions of the present invention may be formulated as non-viscous, flowable liquids which are particularly useful in bonding operations involving well-mated surfaces (e.g., a nut and bolt). The compositions may also comprise various types of modifying polymers in order to obtain desired properties. For example, thermoplastic polymers or pressure-sensitive polymers may be added to the compositions of the present invention to obtain compositions which are useful in a variety of other bonding operations.

DETAILED DESCRIPTION OF THE PRESENT INVENTION

The anaerobic compositions of the present invention comprise 100 parts by weight of a polymerizable monomer (A) having at least one $\alpha,\beta$-unsaturated carboxyl functionality (i.e., 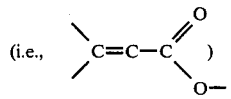 )

per molecule of monomer. Suitable monomers for employment in the compositions of the present invention include the diacrylates and dimethacrylates described in U.S. Pat. Nos. 3,043,820 (Krieble), 3,457,212 (Fukuoka et al.), 3,923,737 (George et al.), and 3,944,521 (Bradley et al.), incorporated herein by reference. Other suitable polymerizable monomers include acrylate-terminated monomers such as the monomeric polyacrylate esters formed from organic polyisocyanates, such monomers being described, for example, in U.S. Pat. No. 3,425,988 (Gorman et al.), incorporated herein by reference. Particularly suitable polyfunctional acrylates or methacrylates include triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycol ddimethacrylate, ethoxylated bisphenol A dimethacrylate, propoxylated bisphenol C dimethacrylate and bisphenol A bis(2-hydroxypropyl)dimethacrylate.

Monoacrylates and monomethacrylates are also suitable for employment in the compositions of the present invention as the polymerizable monomer. Suitable monoacrylates and monomethacrylates include cyclohexyl methacrylate, 2-ethylhexyl methacrylate, hydroxyethyl methacrylate, isooctyl acrylate and n-butyl acrylate.

Methacrylic acid and similar $\alpha,\beta$-unsaturated carboxylic acids are also suitable for employment as polymerizable monomers in the compositions of the present invention as are half-esters such as the 2-hydroxyethyl methacrylate half-ester of maleic acid. Other suitable half-esters include those described in U.S. Pat. Nos.

3,428,614 (Brownstein) and 4,080,238 (Wolinski et al.), incorporated herein by reference.

In order to enhance the shelf-life of the compositions of the present invention it may be desirable to remove metal ions, if such are present, from the polymerizable monomer. This may be particularly desirable in the event that commercially-obtained monomers, which often contain significant amounts of metal ions, are employed in these compositions. Removal of metal ions may be effected by means known to those skilled in the art.

The compositions of the present invention may comprise a single type of polymerizable monomer or may comprise a blend of two or more different polymerizable monomers.

Compositions of the present invention further comprise about 0.5 to 20 parts by weight and preferably 1 to 10 parts by weight of a halogen-containing compound (B) as a first initiator component per 100 parts by weight of the polymerizable monomer (A). The nature of the halogen-containing compound is not believed to be critical except that the halogen-containing compound should be of an electronic structure which facilitates free-radical formation. One such class of suitable halogen-containing compounds is defined by the following general formula (I):

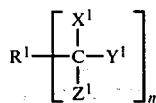
(I)

wherein:
$X^1$ is selected from the group consisting of H, $CH_3$, Cl, and Br;
$Y^1$ and $Z^1$ are each selected independently from the group consisting of Cl and Br;
$R^1$ is selected from the group consisting of aromatic and heteroaromatic residues; and
n is an integer from 1 to 3 inclusive.

It is to be understood that $R^1$ of formula (I) may contain any substituent which does not adversely affect the compound for its intended use as an initiator component.

Examples of suitable halogen-containing compounds of the above general formula are α,α,α-trichlorotoluene, α,α,α,α',α',α'-hexachloro-p-xylene, α,α,α-tribromoquinaldine,

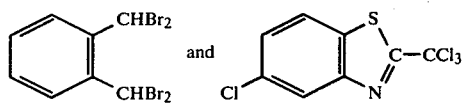

Preferred halogen-containing compounds of the above general formula (I) are further defined by the following general formula (II):

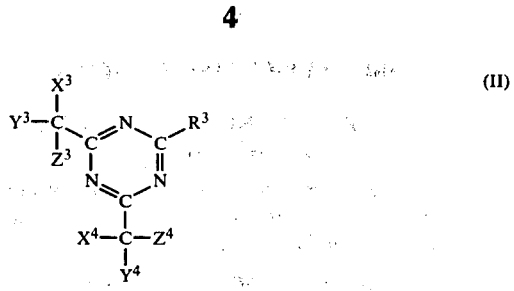
(II)

wherein:
$X^3$ and $X^4$ are each selected independently from the group consisting of H, $CH_3$, Cl, and Br;
$Y^3$, $Y^4$, $Z^3$ and $Z^4$ are each independently selected from the group consisting of Cl and Br; and
$R^3$ is selected from the group consisting of H and organic radicals comprising 1 to about 10 carbons. Preferred organic radicals are alkyl, haloalkyl, alkylene, and aromatic groups.

It is to be understood that $R^3$ of the above formula (II) may contain any substituent which does not adversely affect the compound for its intended use as an initiator component.

Suitable halogen-containing compounds of formula (II) include those described in U.S. Pat. Nos. 3,277,091 (Schmelzer et al.) and 3,954,475 and 3,987,037 (both to Bonham et al.), incorporated herein by reference. Examples of this preferred class are 2,4-Bis-(trichloromethyl)-6-methyl-s-triazine, 2,4,6-Tris-(trichloromethyl)-s-triazine, 2,4,6-Tris-(tribromomethyl)-s-triazine, and 2,4-Bis(trichloromethyl)-6-p-methoxystryryl-s-triazine, all prepared in accordance with the teachings of Wakabayashi et al., Bulletin of the Chemical Society of Japan, 42, 2924–30 (1969), an article referenced in said U.S. Pat. Nos. 3,954,475 and 3,987,037 and

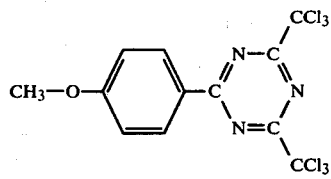

prepared in accordance with the teachings of said U.S. Pat. No. 3,277,091.

A second class of suitable halogen-containing compounds is defined by the following general formula (III):

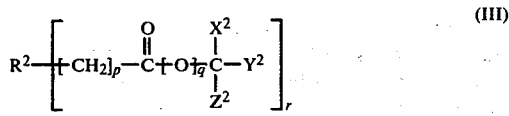
(III)

wherein:
$X^2$ is selected from the group consisting of H, Cl, Br and CN;
$Y^2$ and $Z^2$ are each selected independently from the group consisting of Cl and Br;
$R^2$ is selected from the group consisting of amino residues and organic radicals, preferably hydrocarbon groups, comprising 1 to about 10 carbons. Preferred hydrocarbon groups are alkyl groups and aryl groups;
p is 0 or 1;

q is 0 or 1; and
r is 1 or 2.

It is to be understood that $R^2$ of formula (III) may contain any substituent which does not adversely affect the compound for its intended use as an initiator component.

Examples of suitable halogen-containing compounds of formula (III) are dibromocyanoacetamide, $CH_3CH_2CH(CH_2CO_2CBr_3)_2$, $CH_3CH_2CH(CH_2CO_2CBr_3)_2$,

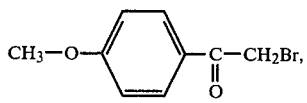

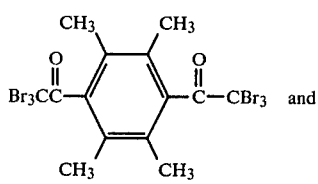

and

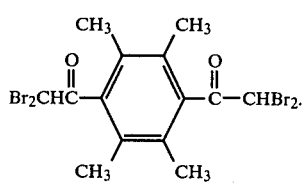

Other examples of halogen-containing compounds which are suitable for employment in the compositions of the present invention, but which do not fall within any of the above-mentioned formulas, are 1-trichloromethyl-cis-perhydropentalene and 1,1,1-trichloro-2-methyl-2-propanol hydrate.

The compositions of the present invention may comprise a single type of halogen-containing compound or may comprise two or more different types of halogen-containing compounds.

Compositions of the present invention also comprise an organic thiol as a second initiator component (C). The organic thiol is present in the compositions of the present invention in amounts of about 0.05 to 0.5 parts by weight and preferably 0.1 to 0.3 parts by weight per 100 parts by weight of the polymerizable monomer.

One class of thiols which are suitable for use as the second initiator component are of the following general formula (IV):

$$R^4-SH \qquad (IV)$$

wherein:
$R^4$ is an organic radical comprising 1 to about 20 carbon atoms and preferably 6 to 18 carbon atoms. While it is preferred that $R^4$ of formula (IV) be an unsubstituted hydrocarbon group of 1 to about 20 carbon atoms, $R^4$ may contain any substituent which does not adversely affect the compound for its intended use as an initiator component. $R^4$ may be either an aliphatic or aromatic group.

Examples of suitable thiols of formula (IV) are tert-hexadecyl mercaptan, benzyl mercaptan, 2,3-dimercapto succinic acid, thiomalic acid, oxydibenzyl mercaptan, and pentachlorothiolphenol. Preferred thiols of formula (IV) are dodecylmercaptan and octylmercaptan.

A second class of thiols which are suitable for use as the second initiator component are mercapto esters.

Examples of suitable mercapto esters are glycol dimercaptoacetate, methyl mercaptopropionate, glycol dimercaptopropionate, pentaerythritol tetra (3-mercaptopropionate), pentaerythritol tetrathioglycolate, trimethylolethane tri(3-mercaptopropionate), trimethylolethane trithioglycolate, trimethylolpropane tri(3-mercaptopropionate) and trimethylolpropane trithioglycolate.

It has also been found in the present invention that inclusion of certain amines in combination with the halogen-containing compound (B) and the organic thiol (C) in the compositions of the present invention results in compositions exhibiting particularly suitable cures. These compositions may comprise up to about 20 parts by weight and preferably about 1 to 10 parts by weight of an amine per 100 parts by weight of the polymerizable monomer (A). Suitable amines for employment in these compositions are secondary amines and tertiary amines, examples of the aforementioned types of amines being described in copending application Ser. No. 289,703, filed of even date and commonly assigned, which is a continuation-in-part of application Ser. No. 203,682, filed on Nov. 3, 1981, and now abandoned, and commonly assigned, both incorporated herein by reference.

More particularly, suitable secondary amines are of the following formula (V):

wherein:
$R^5$ and $R^6$ are each organic radicals, preferably hydrocarbon groups, comprising 1 to about 12 carbons.

It is to be understood that $R^5$ and $R^6$ of formula (V) can be united to form a heterocyclic secondary amine.

Examples of suitable secondary amines of formula (VI) are N,N-diethylamine, N,N-diphenylamine and homopiperidene.

Suitable tertiary amines are of the following formula (VI):

wherein:
$R^7$, $R^8$ and $R^9$ are each organic radicals, preferably hydrocarbon groups, comprising 1 to about 12 carbons.

It is to be understood that any two of $R^7$, $R^8$ and $R^9$ of formula (VI) may be combined to form a heterocyclic tertiary amine.

Examples of suitable tertiary amines of formula (VI) are triethyl amine, tripropyl amine, tributyl amine, N,N-dimethyl cyclohexylamine, N,N-dimethyl ethanol amine and 2-aminopyridine.

Within formula (VI) is the preferred class of tertiary amines, namely tertiary aromatic amines, of the more specific formula (VII):

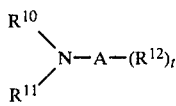

(VII)

wherein:
R[10] and R[11] are each organic radicals, preferably hydrocarbon groups, comprising up to about 12 carbons;
A is a carbocyclic aromatic nucleus selected from the group consisting of phenyl and naphthyl radicals;
R[12] is an organic radical comprising up to about 5 carbons and is selected from the group consisting of alkyl and alkoxy radicals; and
t is from 0 to 3 inclusive.

Examples of suitable tertiary aromatic amines of formula (VII) are N,N-diethyl-p-toluidine, N,N-dimethylaniline, N,N-diethylaniline, and N,N-bis-(2-hydroxyethyl)-p-toluidine. The preferred tertiary aromatic amine is N,N-dimethyl-p-toluidine.

A preferred amine for employment in the preferred dodecyl mercaptan-containing compositions of the present invention is above-mentioned N,N-dimethyl-p-toluidine.

In order to obtain compositions exhibiting suitable shelf-life, the compositions of the present invention also comprise a sufficient amount of an inhibitor of free-radical polymerization to retard polymerization of the compositions while in the presence of air. Preferred compositions of the present invention comprise about 0.0005 to 0.10 parts by weight and most preferably about 0.001 to 0.03 parts by weight of a conventional quinone-type inhibitor (i.e., quinone and its derivatives) per 100 parts by weight of the polymerizable monomer (A). Preferred quinone-type inhibitors for employment in the compositions of the present invention are hydroquinone, methylhydroquinone and benzoquinone. Other suitable quinone-type inhibitors are described in U.S. Pat. No. 4,166,169 (Patel et al.), incorporated herein by reference. Other inhibitors of free-radical polymerization which are well-known in the art may also be used in the compositions of the present invention.

Employment of a commercially obtained polymerizable monomer, which generally will already contain a conventional inhibitor (e.g., hydroquinone or methylhydroquinone), may introduce a sufficient amount of the inhibitor into the compositions of the present invention such that it may be unnecessary to separately add additional inhibitor.

Compositions comprising the aforementioned components (A), (B) and (C) generally exhibit low viscosity and are particularly useful for bonding well mated surfaces such as the threads of a nut and bolt. Fixturing of the surfaces involved in the bonding operation may be necessary when employing compositions comprising only components (A), (B), and (C) until sufficient bond strength has developed. Fixture time (i.e., the time required to develop a bond between surfaces which will withstand forces exerted with "hand strength") will typically be within less than about 1 hour at room temperature.

In many bonding applications, it may be desirable to achieve bonding characteristics not obtainable with compositions comprising only components (A), (B), and (C). Thus, the compositions of the present invention may further comprise up to about 950 parts by weight of various modifying polymers per 100 parts by weight of the polymerizable monomer (A). Modifying polymers which may be present in these compositions include polymers added to obtain desired viscosities. Other modifying polymers which may be present in these compositions include thermoplastic polymers and pressure-sensitive polymers, the latter also generally being thermoplastic in nature. Preferred modifying polymers are substantially nonreactive (i.e., will not generally be subject to free-radical-initiated polymerization under the anaerobic conditions typically used to cure the compositions of the present invention).

Polymers useful as modifying polymers for providing compositions exhibiting increased viscosity are well-known in the art and include cellulose acetate butyrates, polymethacrylates, phenoxy resins, polyesters and polyurethanes. A preferred modifying polymer for increasing viscosities of these compositions is "PKHA Resin" (a phenoxy resin commercially available from Union Carbide). A particularly suitable amount of the modifying polymers for providing compositions exhibiting increased viscosities is up to about 25 parts by weight per 100 parts by weight of the polymerizable monomer (A).

Thermoplastic polymers useful as modifying polymers in these compositions are well-known in the art and include those described in U.S. Pat. No. 3,996,308 (Douek et al.), incorporated herein by reference. Examples of particularly suitable thermoplastic polymers include polyvinyl acetates (e.g. that available under the trade designation "AYAT Resin" from Union Carbide), phenoxy resins (e.g., that available under the trade designation "PKHJ Resin" from Union Carbide), polyesters (e.g. that available under the trade designation "Vitel 207" from B. F. Goodrich), polyurethanes (e.g. that available under the trade designation "Estane 5712" from B. F. Goodrich), and nitrile rubbers (e.g., that available under the trade designation "Hycar 1072" from B. F. Goodrich).

Pressure-sensitive polymers useful as modifying polymers in these compositions include those described in U.S. Pat. No. Re. 24,906 (Ulrich) and U.S. Pat. No. 4,113,792 (Pastor et al.), both incorporated herein by reference. Examples of particularly suitable pressure-sensitive polymers include copolymers of isooctyl acrylate and acrylic acid, copolymers of isobutyl acrylate and acrylic acid and copolymers of n-butyl acrylate and acrylic acid, these copolymers preferably containing about 90% by weight of the respective alkyl acrylate and about 10% by weight of acrylic acid. Another suitable polymer is the terpolymer containing isobutyl acrylate, n-butyl acrylate and acrylic acid residues.

A particularly suitable amount of thermoplastic or pressure-sensitive modifying polymers for employment in the compositions of the present invention is from about 25 to 500 parts by weight per 100 parts by weight of the polymerizable monomer (A).

Compositions of the present invention which comprise the various modifying polymers discussed above may further comprise the various tackifiers, plasticizers and the like which are well known in the art in order to obtain desired properties.

Compositions comprising modifying polymers may be conveniently applied to surfaces as viscous neat liquids, sheets, films, tapes and the like, or as solutions in suitable organic solvents. Depending on the type of modifying polymer employed in the composition, fixturing of the surfaces involved in the bonding operation may or may not be necessary.

It is understood that the compositions of the present invention may also comprise various other ingredients such as fillers, thickening agents, and the like which are well-known in the art.

It is also understood that the compositions of the present invention may be formulated as two-part compositions with at least one part comprising as a major constituent a polymerizable monomer and with one part comprising the first initiator component (i.e., a halogen-containing compound) and the other part comprising the second initiator component (i.e., an organic thiol). If only one part comprises a polymerizable monomer, the monomer-less part may comprise the respective initiator component combined with a suitable vehicle such as a volatile organic solvent. Alternatively, if that initiator component is a neat liquid, it can be employed simply as such.

When the composition of the present invention are employed in bonding operations involving at least one active metal surface (e.g., copper and cold-rolled steel), cure will rapidly ensue at room temperature in the absence of oxygen. However, it is known that anaerobically-curing compositions, including those of the present invention, may cure only very slowly, if at all, when no active metal surfaces are involved in the bonding operation. Thus when the compositions of the present invention are to be employed in bonding operations involving relatively inactive metals (e.g., cadmium and zinc) or nonmetal substrates (e.g., plastic, glass and wood) or combinations thereof, it is often desirable or perhaps even necessary to employ an appropriate activator which is preapplied to at least one of the surfaces to be bonded. Such an activator can, of course, be employed to further accelerate cure when active metal surfaces are involved in the bonding operation.

Particularly suitable activators include compounds containing transition metal ions, examples of such activators including iron acetylacetonate, vanadium acetylacetonate, and copper octoate. A preferred activator of this type is copper acetylacetonate. It may be desirable to employ an activator having the metal ion in a higher versus lower oxidation state.

The activator may be applied to a substrate by means of a suitable vehicle. For example, the activator may be applied as a solution in a volatile organic solvent. A volatile organic solvent is desirable as a vehicle for the activator in order to insure rapid evaporation of the solvent and to thus reduce the possibility of entrapment of solvent between the surfaces being bonded as the bonding operation proceeds. A preferred solvent for use in the present invention is methylene chloride. Activators which are liquids or solids at the temperature at which the bonding operation is conducted may also be applied directly to a substrate without dissolution in a vehicle.

In the following examples which will serve to illustrate the present invention all parts are parts by weight and all percentages are percentages by weight, unless otherwise indicated.

TEST METHODS

Accelerated Shelf-life Stability—Test Method A

In testing the accelerated stability of a composition, a 500 cc polyethylene bottle is filled with approximately 250 cc of the composition and the bottle is then sealed with a screw cap. The bottle and contents are stored at 120° F. (49° C.) for 28 days, after which time the contents are examined for polymerization and for curability.

Overlap Shear—Test Method B

In testing the performance of a composition, 3 to 4 drops (about 0.15 to 0.20 cc) of the composition is applied to an etched aluminum strip which in turn is brought into contact with a second etched aluminum strip such that the area of adhesive bonding between the two strips measures 1-inch$^2$ (6.45 cm$^2$). The etched aluminum strips have previously been primed with a 1% solution (w/w) of copper (II) acetylacetonate in methylene chloride. The handling time (i.e., the time at which the two strips could no longer be pulled apart with gentle hand pressure) is measured in hours. The bond is then allowed to condition for 3 days at room temperature, at which time overlap shear value (given in pounds per square inch, hereinafter "psi") is determined using an Instron Dynamic tester with a jaw separation rate of 0.2 inch (0.51 cm) per minute.

Thread Locking—Test Method C

In testing the performance of a composition, one drop (about 0.05 cc) of the composition is applied to the threads of a cleaned ⅜-inch (0.95 cm) No. 16, grade 5, plain finished steel bolt to which a mating nut is subsequently applied. The fixture time (i.e., the time at which the nut could no longer be unscrewed from the bolt using hand strength only) is determined at room temperature. The nut and bolt assembly is then allowed to condition for 24 hours at room temperature and break away torque and prevailing off torque values are subsequently measured (both given in inch/pounds).

EXAMPLE 1

A suitable anaerobically-curing composition in accordance with the present invention is prepared using the following ingredients combined in the order indicated:

|  | Parts by Weight |
|---|---|
| "SR-205" (tetraethylene glycol dimethacrylate available from Sartomer Company) | 100 |
| 2,4-Bis-(trichloromethyl)-6-methyl-s-triazine | 3 |
| Dodecylmercaptan | 0.4 |
| Benzoquinone | 0.02 |

The above composition exhibits a suitable shelf-life when stored in the presence of oxygen and cures rapidly in the absence of oxygen when applied to an active metal surface.

When the above composition is tested in accordance with Test Method B, the handling time is less than about 1 hour and the overlap shear value is about 200 pounds per square inch (14.1 kg/cm$^2$).

EXAMPLE 2

Another suitable anaerobically-curing composition in accordance with the present invention is prepared using the following ingredients combined in the order indicated:

|  | Parts by Weight |
|---|---|
| "SR-205" | 100 |

-continued

|  | Parts by Weight |
|---|---|
| 2,4-Bis-(trichloromethyl)-6-methyl-s-triazine | 3 |
| Benzyl mercaptan | 0.4 |
| Benzoquinone | 0.02 |

The above composition exhibits a suitable shelf-life when stored in the presence of oxygen.

When the above composition is tested in accordance with Test Method B, the handling time is less than about 30 minutes and the overlap shear value is about 180 pounds per square inch (12.6 kg/cm$^2$).

EXAMPLE 3

Another suitable anaerobically-curing comosition in accordance with the present invention is prepared using the following ingredients combined in the order indicated:

|  | Parts by Weight |
|---|---|
| "SR-205" | 100 |
| 2,4-Bis-(trichloromethyl)-6-methyl-s-triazine | 3 |
| Methyl mercaptopropionate | 0.4 |
| Benzoquinone | 0.02 |

The above composition exhibits a suitable shelf-life when stored in the presence of oxygen.

When the above composition is tested in accordance with Test Method B, the handling time is less than about 1 hour and the overlap shear value is about 200 pounds per square inch (14.1 kg/cm$^2$).

EXAMPLE 4

Another suitable anaerobically-curing composition in accordance with the present invention is prepared using the following ingredients combined in the order indicated:

|  | Parts by Weight |
|---|---|
| "SR-205" | 100 |
| (o-C$_6$H$_4$(CHBr$_2$)$_2$) | 3 |
| Dodecyl mercaptan | 0.2 |
| Benzoquinone | 0.02 |

The above compositions exhibits a suitable shelf-life when stored in the presence of oxygen.

The the above composition is tested in accordance with Test Method B, the handling time is less than about 80 minutes.

EXAMPLE 5

Another suitable anaerobically-curing composition in accordance with the present invention is prepared using the following ingredients combined in the order indicated:

|  | Parts by Weight |
|---|---|
| "SR-205" | 100 |

-continued

|  | Parts by Weight |
|---|---|
| 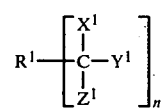 (chlorobenzothiophene-C—CCl$_3$) | 3 |
| Dodecyl mercaptan | 0.2 |
| Benzoquinone | 0.02 |

The above composition exhibits a suitable shelf-life when stored in the presence of oxygen.

When the above composition is tested in accordance with Test Method B, the fixture time is less than about 30 minutes, and the overlap shear value is about 180 pounds per square inch (12.6 kg/cm$^2$).

EXAMPLE 6

A suitable anaerobically-curing composition comprising a pressure-sensitive polymer is prepared from the following ingredients:

|  | Parts by weight |
|---|---|
| Isooctyl acrylate (90% by weight)/acrylic acid (10% by weight) copolymer (prepared in accordance with the procedures of U.S. Pat. No. Re. 24,906 (Ulrich), incorporated herein by reference) | 7.0 |
| "Epocryl 12" (a reaction product of methacrylic acid and an epoxy resin; available from Shell Chemical Co.) | 2.0 |
| Methacrylic acid | 2.0 |
| 2,4-Bis-(trichloromethyl)-6-methyl-s-triazine | 0.3 |
| Dodecyl thiol | 0.04 |
| Benzoquinone | 0.005 |
| Acetone | 7.6 |

When the above composition is tested in accordance with Test Method B, the overlap shear value is about 750 pounds per square inch (52.7 kg/cm$^2$).

When 0.3 parts by weight of N,N-dimethyl-p-toluidine is added to the above composition and the resulting composition is tested in accordance with Test Method B except that here the aluminum strips are unetched and have been wiped with methyl ethyl ketone prior to priming, the overlap shear value is about 1150 pounds per square inch (80.8 kg/cm$^2$).

I claim:

1. An anaerobically-curing composition comprising a first part and a second part, with at least one of said first part and said second part comprising as a major constituent a polymerizable monomer having at least one of $\alpha,\beta$-unsaturated carboxyl functionality per molecule of monomer, and with said first part comprising as a first initiator component a halogen-containing compound selected from the group consisting of compounds of the formula $$R^1 \!\!-\!\!\left[\begin{array}{c} X^1 \\ | \\ C\!-\!Y^1 \\ | \\ Z^1 \end{array}\right]_n$$

wherein:

$X^1$ is selected from the group consisting of H, CH$_3$, Cl, and Br;

$Y^1$ and $Z^1$ are each selected independently from the group consisting of Cl and Br;

$R^1$ is selected from the group consisting of aromatic and heteroaromatic residues; and n is an integer from 1 to 3 inclusive; compounds of the formula

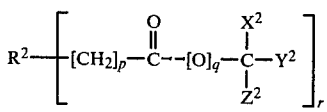

wherein $X^2$ is selected from the group consisting of H, Cl, Br and CN;

$Y^2$ and $Z^2$ are each selected independently from the group consisting of Cl and Br;

$R^2$ is selected from the group consisting of —NH$_2$, an alkyl radical comprising 1 to about 10 carbons, an aryl radical comprising 1 to about 10 carbons, a methoxy-substituted aryl radical comprising 1 to about 10 carbons and a methyl-substituted aryl radical comprising 1 to about 10 carbons;

p is 0 or 1;

q is 0 or 1; and r is 1 or 2; and 1,trichloromethyl-cis-perhydropentalene; and 1,1,1-trichloro-2-methyl-2-propanolhydrate;

and with said second part comprising as a second initiator component an organic thiol selected from the group consisting of a compound of the formula

wherein:

$R^4$ is an unsubstituted hydrocarbon group of 1 to about 20 carbons;

a mercapto ester, 2,3-dimercaptosuccinic acid, thiomalic acid, oxydibenzyl mercaptan, and pentachlorothiophenol.

2. An anaerobically-curing composition, comprising:
(A) a polymerizable monomer having at least one α,β-unsaturated carboxyl functionality per molecule of monomer;
(B) an effective amount of a halogen-containing compound as a first initiator component and selected from the group consisting of compounds of the formula

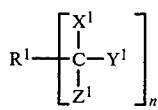

wherein:

$X^1$ is selected from the group consisting of H, CH$_3$, Cl, and Br;

$Y^1$ and $Z^1$ are each selected independently from the group consisting of Cl and Br;

$R^1$ is selected from the group consisting of aromatic and heteroaromatic residues; and n is an integer from 1 to 3 inclusive; compounds of the formula

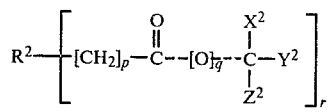

wherein:

$X^2$ is selected from the group consisting of H, Cl, Br and CN;

$Y^2$ and $Z^2$ are each selected independently from the group consisting of Cl and Br;

$R^2$ is selected from the group consisting of —NH$_2$, an alkyl radical comprising 1 to about 10 carbons, an aryl radical comprising 1 to about 10 carbons, a methoxy-substituted aryl radical comprising 1 to about 10 carbons, and a methyl-substituted aryl radical comprising 1 to about 10 carbons;

p is 0 or 1;

q is 0 or 1; and r is 1 or 2;

1-trichloromethyl-cis-perhydropentalene; and 1,1,1-trichloro-2-methyl-2-propanol hydrate;

(C) as a second initiator component, an effective amount of an organic thiol selected from the group consisting of compounds of the formula

wherein:

$R^4$ is an unsubstituted hydrocarbon group of 1 to about 20 carbons;

a mercaptoester, 2,3-dimercapto succinic acid, thiomalic acid, oxydibenzyl mercaptan, and pentachlorothiolphenol; and (D) a sufficient amount of an inhibitor of free-radical polymerization to retard polymerization of said composition while in the presence of air.

3. An anaerobically-curing composition in accordance with claim 2, wherein said polymerizable monomer is present in an amount of 100 parts by weight, said first initiator is present in an amount of about 0.5 to 20 parts by weight, and said second initiator component is present in an amount of about 0.05 to 0.5 parts by weight.

4. An anaerobically-curing composition in accordance with claim 3, wherein said polymerizable monomer is selected from the group consisting of triethyleneglycol dimethacrylate, ethyleneglycol dimethacrylate, tetraethyleneglycol dimethacrylate, polyethyleneglycol dimethacrylate, polyethyleneglycol diacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate, bisphenol A bis(2-hydroxypropyl) dimethacrylate, cyclohexyl methacrylate, 2-ethylhexyl methacrylate, hydroxyethyl methacrylate, isooctyl acrylate, n-butyl acrylate, methacrylic acid, the 2-hydroxyethyl methacrylate half-ester of maleic acid, and monomeric polyacrylate esters formed from isocyanates.

5. An anaerobically-curing composition in accordance with claim 3, wherein said halogen-containing compound is of the formula:

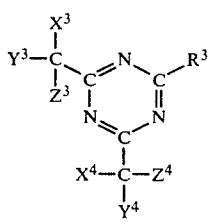

wherein:
X³ and X⁴ are each selected independently from the group consisting of H, CH₃, Cl, and Br;
Y³, Y⁴, Z³ and Z⁴ are each independently selected from the group consisting of Cl and Br; and
R³ is selected from the group consisting of H and an organic radical which comprises 1 to about 10 carbons and is selected from the group consisting of alkyl, haloalkyl and aromatic.

6. An anaerobically-curing composition in accordance with claim 3, wherein said halogen-containing compound is selected from the group consisting of α,α,α-trichlorotoluene, α,α,α,α',α',α',-hexachloro-p-xylene,-α,α,α-tribromoquinaldine, dibromocyanoacetamide,

 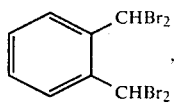

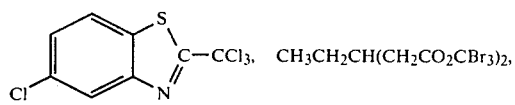

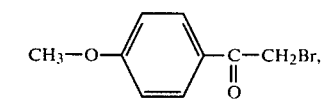

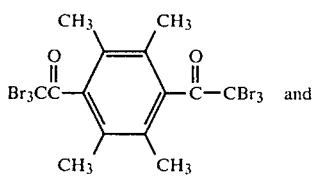

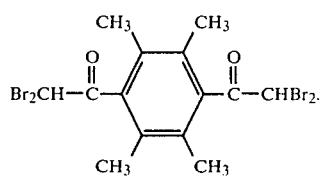

7. An anaerobically-curing composition in accordance with claim 5, wherein said halogen-containing compound is selected from the group consisting of
2,4-Bis-(trichloromethyl)-6-methyl-s-triazine,
2,4,6-Tris-(trichloromethyl)-s-triazine,
2,4,6-Tris-(tribromomethyl)-s-triazine,
2,4-bis-(trichloromethyl)-6-p-methoxystyryl-s-triazine and

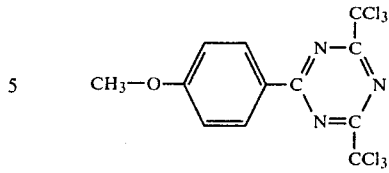

8. An anaerobically-curing composition in accordance with claim 3, wherein said organic thiol is of the formula $R^4-SH$ wherein:
R⁴ is an unsubstituted hydrocarbon group of 6 to 18 carbons.

9. An anaerobically-curing composition in accordance with claim 3, wherein said organic thiol is selected from the group consisting of dodecyl mercaptan and octyl mercaptan.

10. An anaerobically-curing composition in accordance with claim 3, wherein said organic thiol is a mercapto ester.

11. An anaerobically-curing composition in accordance with claim 10, wherein said organic thiol is selected from the group consisting of glycol dimercaptoacetate, methylmercaptopropionate, glycol dimercaptopropionate, pentaerythritol tetra(3-mercaptopropionate), pentaerythritol tetrathiolglycolate, trimethylolethane tri(3-mercaptopropionate), trimethylolethane trithioglycolate, trimethylolpropane tri(3-mercaptopropionate) and trimethylolpropane trithioglycolate.

12. An anaerobically-curing composition in accordance with claim 3, wherein said inhibitor is a quinone-type inhibitor which is present in an amount of about 0.0005 to 0.1 parts by weight.

13. An anaerobically-curing composition in accordance with claim 3, wherein said composition further comprises up to about 20 parts by weight of an amine selected from the group consisting of secondary amines and tertiary amines.

14. An anaerobically-curing composition in accordance with claim 13, wherein said amine is a tertiary aromatic amine of the formula

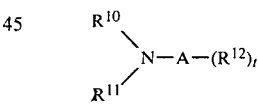

wherein:
R¹⁰ and R¹¹ are each hydrocarbon goups comprising up to about 12 carbons;
A is a carbocyclic aromatic nucleus selected from the group consisting of phenyl and naphthyl radicals;
R¹² is an organic radical comprising up to about 5 carbons and is selected from the group consisting of alkyl and alkoxy radicals; and
t is from 0 to 3 inclusive.

15. An anaerobically-curing composition in accordance with claim 14, wherein said amine is selected from the group consisting of N,N-diethyl-p-toluidine, N,N-dimethylaniline, N,N-diethylaniline, N,N-bis-(2-hydroxyethyl)-p-toluidine and N,N-dimethyl-p-toluidine.

16. An anaerobically-curing composition in accordance with claim 3, wherein said halogen-containing compound is present in an amount of about 1 to 10 parts by weight and said organic thiol is present in an amount of about 0.1 to 0.3 parts by weight.

* * * * *